J. C. SYMMES.

Breech Loading Fire Arm.

No. 3,946. Reissued May 3, 1870.

N. PETERS, Photo-Lithographer, Washington, D. C.

UNITED STATES PATENT OFFICE.

WILLIAM N. ELY, OF STRATFORD, CONNECTICUT, TRUSTEE AND ASSIGNEE OF JOHN CLEVES SYMMES.

IMPROVEMENT IN BREECH-LOADING FIRE-ARMS.

Specification forming part of Letters Patent No. 22,094, dated November 16, 1858; Reissue No. 3,946, dated May 3, 1870.

*To all whom it may concern:*

Be it known that JOHN CLEVES SYMMES, late of the Regular Army, stationed at Watertown, in the State of Massachusetts, invented certain Improvements in Breech-Loading Fire-Arms, of which the following, with the drawings, is a full description.

Figure 1:
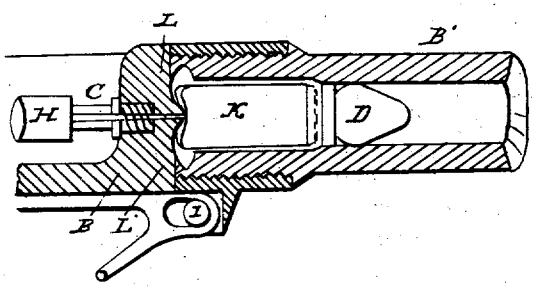

Figure 1 is a central vertical section through a breech and barrel, with arrangement for packing the joint between them to prevent the escape of the gases of explosion, the object of the invention being, among other things, for the accomplishment of this end.

B represents the breech hinged to the barrel at I, so as to swing backward and downward.

B′ is the barrel with a cartridge, K D.

C is a cone or striking-head, upon which a hammer, H, strikes for the purpose of exploding the cartridge.

L and L′ are sections of the annular lip or gas-check.

Upon exploding the cartridge by a blow of the hammer H upon the cone or pin C, the powder-gas will press upon all parts of the chamber, and the breech B will be forced appreciably backward. If the lip L and L′ were stiff and rigid, there must be an escape of gas between the breech and barrel; but the lip being made thin and flexible, it will partially yield to the pressure from within, and will follow the slight recession of B and remain in contact with it and check the gas.

Figure 2:
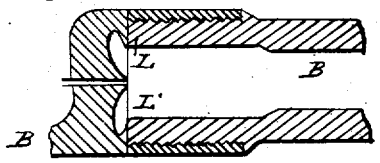
Figure 3:
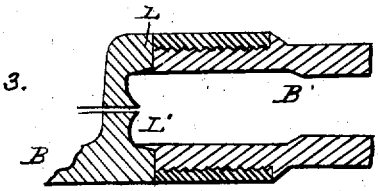
Figure 3:
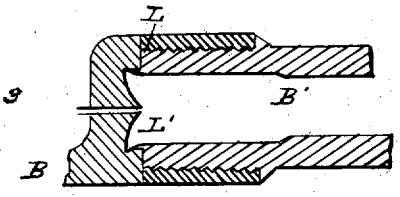
Figure 4:
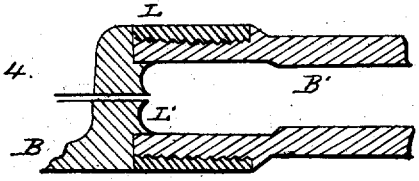

By reference to Figs, 1, 2, 3, 3′, and 4 various arrangements of the lip L L′ are seen. In Fig. 2 the lip is a part of the breech B. In Figs. 3 and 3′ it is upon the barrel and protruding into the breech, while in Fig. 4 it is upon the breech protruding into the barrel. Any two of these may be combined. It is better to have as great an extent of distance between the inner edge of the lip and the outer surface of barrel or breech as possible, as in Figs. 3, 3′, and 4, for without the lip there would be very little escape in either Fig. 3 or Fig. 4; but with the lip the escape of gas is quite cut off. The manner of hinging the breech as in Fig. 1 would hardly do with Figs. 3′ and 4 without modification. In these cases the breech and barrel should approach along a straight line. The percussioning and the blow of the hammer operate substantially in a line or parallel with the axis of the bore of the barrel and are simple and sure. The breech-piece swings on a transverse joint or hinge-pin, I, the hole in the breech-piece or tongue of the hinge through which the pin passes being elongated, as shown in Fig. 1, to allow of a slight movement in a line with the barrel, so that the breech may swing up and then move toward the barrel in forcing home the cartridge; and it also has the effect to relieve the strain from the hinge-pin at the time of the discharge, thus enabling the rearward force of the discharge to be taken upon the recoil-shoulder in rear of the breech-piece. This elongation of the hinge-pin hole, (which of course may be in the tongue or ears of the hinge,) or its equivalent, as and for the purposes aforesaid, will apply to any unchambered swinging breech, which, being hinged at its forward end, swings away from the charge-chamber of the barrel to open it, and toward such chamber to close it and cover the cartridge.

I do not mean to claim what would be termed a "break-down" gun.

What I claim is—

1. The elastic flexible lip, substantially as described, when applied to checking the escape of gas from the breech of a gun.

2. The backward and downward swinging breech, constructed and combined with a percussioning or transmissory means for exploding the cartridge, substantially as shown, when arranged to operate substantially in a line with the bore of the barrel, as set forth.

3. The backward and downward swinging breech, having a percussioning for exploding the cartridge passing through it, substantially as shown, in combination with the hammer, when arranged to operate thereon, substantially in the manner described.

4. In combination with the barrel of a fire-arm, an unchambered breech-piece hinged at its forward end, and swinging away from the chamber of the barrel to open it, and toward such chamber to close it, and cover the cartridge when provided with an elongated hinge-pin hole, or its equivalent, as and for the purposes substantially as described.

In witness whereof I hereby sign the foregoing specification.

WILLIAM N. ELY, *Trustee.*

Witnesses:

CHAS. B. PERRY,

C. J. HARTT.